| United States Patent [19] | [11] Patent Number: 4,659,653 |
| Sato et al. | [45] Date of Patent: Apr. 21, 1987 |

[54] HEAT DEVELOPABLE LIGHT-SENSITIVE MATERIAL

[75] Inventors: Kazo Sato; Yoshiharu Yabuki; Hiroyuki Hirai; Ken Kawata, all of Kanagawa, Japan

[73] Assignee: Fuji Photo Film Co., Ltd., Japan

[21] Appl. No.: 769,300

[22] Filed: Aug. 26, 1985

[30] Foreign Application Priority Data

Aug. 24, 1984 [JP]  Japan .................................. 59-176399

[51] Int. Cl.$^4$ ................................................ G03C 1/02
[52] U.S. Cl. .................................... 430/559; 430/562; 430/151; 430/171; 430/617; 430/619; 430/620; 430/955; 430/203; 430/351; 430/353
[58] Field of Search ............... 430/617, 619, 955, 203, 430/151, 179, 171, 177, 620, 559, 562, 351, 353

[56] References Cited

U.S. PATENT DOCUMENTS

| | | | |
|---|---|---|---|
| 4,487,826 | 12/1984 | Watanabe et al. | 430/151 |
| 4,514,493 | 4/1985 | Hirai et al. | 430/353 |
| 4,560,763 | 12/1985 | Sato et al. | 430/151 |

FOREIGN PATENT DOCUMENTS 998949  7/1965  United Kingdom ................ 430/151

*Primary Examiner*—Won H. Louie
*Attorney, Agent, or Firm*—Sughrue, Mion, Zinn, Macpeak, and Seas

[57] ABSTRACT

A heat developable light-sensitive material comprising a support having thereon at least a layer containing a novel compound having a group accelerating a reaction of decarboxylation, which releases a base by decarboxylation on heating. The heat developable light-sensitive material provides an image having a high density in a short time and has an improved storage stability.

10 Claims, No Drawings

HEAT DEVELOPABLE LIGHT-SENSITIVE MATERIAL

FIELD OF THE INVENTION

The present invention relates to a heat developable light-sensitive material containing a base precursor.

BACKGROUND OF THE INVENTION

Heat developable light-sensitive materials often contain a base or a base precursor in order to accelerate heat development. And it is preferred to use a base precursor that releases a base by thermal decomposition for obtaining a good storage stability of the light-sensitive material.

Typical examples of base precursors are described in British Pat. No. 998,949. A preferred base precursor is a salt of a carboxylic acid and an organic base. Useful carboxylic acids are trichloroacetic acid and trifluoroacetic acid. Useful bases are guanidine, piperidine, morpholine, p-toluidine and 2-picoline. The guanidine trichloroacetic acid described in U.S. Pat. No. 3,220,846 is particularly useful. The aldoneamides described in Japanese Patent Application (OPI) No. 22625/75 (the term "OPI" as used herein refers to a "published unexamined Japanese patent application") are decomposed to generate bases at a high temperature and are used preferably.

However, the light-sensitive materials containing these base precursors often require a relatively long time to produce an image or have high fog. Moreover, these base precursors are susceptible to being affected by air or moisture and are subsequently decomposed to change the photographic properties of the light-sensitive material or impair its storage.

SUMMARY OF THE INVENTION

An object of the present invention is to provide a heat developable light-sensitive material containing a base precursor which can provide a high density in a short time and has an improved storage stability.

The object is attained by a heat developable light-sensitive material comprising a support having thereon at least a layer containing a base precursor represented by the following general formula (I)

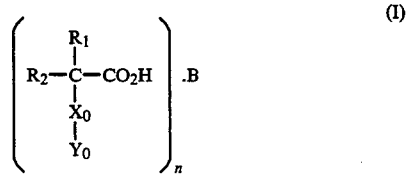

(I)

wherein $R_1$ and $R_2$, which may be the same or different, represent a hydrogen atom; a halogen atom; a substituted or unsubstituted alkyl group, cycloalkyl group, alkenyl group, alkynyl group, aralkyl group, aryl group, heterocyclic group, amino group, alkoxycarbonyl group, aryloxycarbonyl group, carbamoyl group, sulfamoyl group, alkoxy group, aryloxy group, acylamino group or acyloxy group; a sulfonyl group, a phosphonyl group, a phosphinyl group, a thio group, and a sulfinyl group which are substituted by a substituted or unsubstituted alkyl group or aryl group; a cyano group; a carboxy group or a salt of a carboxy group; $R_1$ and $R_2$ may combine with each other to form a ring; $X_0$ represents an oxygen atom or an

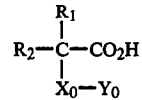

group wherein $R_3$ represents a hydrogen atom, a substituted or unsubstituted alkyl group, or a substituted or unsubstituted aryl group; $Y_0$ represents a group accelerating a reaction of decarboxylation; B represents an organic base; n is 1 when B is a monoacid base, n is 2 when B is a diacid base, and n is a reciprocal of a number of a carboxyl group when an $$R_2-\underset{\underset{Y_0}{\overset{\overset{R_1}{|}}{\underset{|}{C}}}}{\overset{|}{C}}-CO_2H$$

group is a polybasic free acid.

DETAILED DESCRIPTION OF THE INVENTION

In the formula (I) preferably $R_1$ and $R_2$ represent a hydrogen atom; a substituted or unsubstituted alkyl group having 1 through 8 carbon atoms, for example, a methyl group, a butyl group, an octyl group, etc.; a substituted or unsubstituted aryl group having 6 through 12 carbon atoms, for example, a phenyl group, a tolyl group, a p-methoxyphenyl group, a p-chlorophenyl group, etc.; a substituted or unsubstituted aralkyl group having 7 through 14 carbon atoms, for example, a benzyl group, a β-phenethyl group, an α-methylbenzyl group, etc.; a cyano group; an alkylsulfonyl group, for example, a methanesulfonyl group, an ethanesulfonyl group, an octylsulfonyl group, etc.; an arylsulfonyl group, for example, a benzenesulfonyl group, a toluenesulfonyl group, a p-chlorophenylsulfonyl group, etc.; a substituted sulfamoyl group, for example, a dimethylsulfamoyl group, a diethylsulfamoyl group, a morpholinosulfonyl group, etc.; a substituted carbamoyl group, for example, a dimethylcarbamoyl group, a diethylcarbamoyl group, etc.; an alkylthio group, for example, a t-butylthio group, an octylthio group, a dodecylthio group, etc.; an alkoxy group, for example, a methoxy group, a butoxy group, a dodecyloxy group, etc.; an acylamino group, for example, an acetylamino group, a benzoylamino group, a pivaloylamino group, etc.; and a substituted amino group, for example, a diethylamino group, an anilino group, an N-methylanilino group, a morpholyl group, etc.

Preferred examples of a cyclic group which $R_1$ and $R_2$ combine to form are illustrated below.

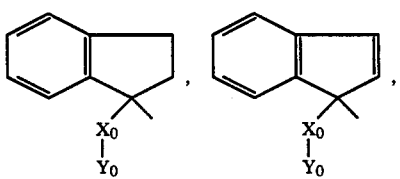

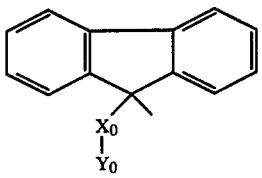

When $R_1$ and $R_2$ are substituted, the preferred substituents include a halogen atom, an alkylsulfonyl group, an alkyl group, an alkoxy group, a nitro group, an acylamino group, a cyano group, a hydroxy group and so on.

Preferred examples of $R_1$ and $R_2$ include a phenyl group, a p-chlorophenyl group, a p-cyanophenyl group, an indenyl group, a fluorenyl group and so on.

$R_1$ and $R_2$ may be the same or different.

In the formula (I), preferably $X_0$ represents an oxygen atom or an

group such that $R_3$ is a hydrogen atom, a —$CH_3$ group, a —$C_2H_5$ group, a

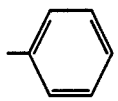

group, a —$CH_2CH_2OH$ group, a —$CH_2CH_2OCH_3$ group or a —$CH_2CH_2CN$ group.

$Y_0$ represents a group accelerating a reaction of decarboxylation from a —$CO_2H$ group by heating.

A released group is generally used as the group accelerating a reaction of decarboxylation.

The released group is released by heating at the same time as decarboxylating. In this case, preferably, $Y_0$ is a group such that a conjugate acid ($Y_0H$) of this group has a pKa value of from 2 to 18. Also, an L value of Swain, which is an index of the tendency of release, preferably is more than $-1$ (a value of Swain is described in E. R. Thornton, *Solvolysis Mechanism*, page 165 (Ronald Press Co., New York, 1964)).

Preferred examples of the released group include:

an alkoxy group and an aryloxy group, for example, a phenoxy group, a 2,4-dichlorophenoxy group, a p-cyanophenyl group and so on; an acylamino group, for example, a trifluoroacetylamino group, a heptafluorobutyroylamino group and so on; a sulfonylamino group, for example, a methanesulfonylamino group, a benzenesulfonylamino group, a p-chlorophenylsulfonylamino group and so on; an imide group, for example, a succinimido group, a hydantoin group, a phthalimido group and so on; an acyloxy group, for example, an acetoxy group, a benzoyloxy group, a p-chlorobenzoyloxy group and so on; a halogen atom, for example, a chlorine atom, a bromine atom, an iodide atom and so on; an alkylthio group and an arylthio group, for example, a phenylthio group, a 1-naphthylthio group, a 2-naphthylthio group and so on; an alkoxycarbonyloxy group and an aryloxycarbonyloxy group, for example, an ethoxycarbonyloxy group, a phenoxycarbamoyloxy group and so on; a dialkylcarbamoyloxy group, for example, a diethylcarbamoyloxy group, a morpholinocarbamoyloxy group and so on; a heterocyclic group containing a nitrogen atom, for example, a 1-pyrazolyl group, a 1-imidazolyl group, a 1-benzimidazolyl group, a 1-benzotriazolyl group and so on.

Preferred examples of $Y_0$ include released groups of 2-equivalent couplers used in a conventional photographic system.

Examples of the released groups of 2-equivalent couplers include a 2,5-dimethyl-1-pyrazolyl group, a benzylethoxyhydantoin group, a dodecylsuccinimido group, a 1-pyridinium group and so on.

A $Y_0$ group is released to form a $Y_0H$ compound (or a $Y_0^-$ ion) at the same time of decarboxylation by heating. When the $Y_0H$ compound derived from a $Y_0$ group is a photographically useful compound, the base precursor of the invention having a $Y_0$ group is particularly useful.

Useful examples of a $Y_0H$ compound include sulfonamide compounds, imido compounds, heterocyclic compounds containing a nitrogen atom, and so on.

A base precursor of the present invention having a $Y_0$ group which is not released and merely accelerating a reaction of decarboxylation is also useful.

This group accelerating a reaction of decarboxylation generally is a group of a conjugated acid which has a pKa value of above 15. Specific examples of the group include an ethoxy group, a t-butoxy group, an acetylamino group, a benzoylamino group and so on.

These $Y_0$ groups may moreover be substituted. Examples of the substituents include an alkyl group, an alkoxy group, a hydroxyl group, a cyano group, an acyloxy group, an acyl group, an acylamino group, a halogen group, a sulfonyl group, a nitro group and so on.

B is an organic base. Desirably a conjugated acid of B (BH) has a pKa value of above 7, and B has less than 12 carbon atoms. Preferably B is a low volatiled base which has a boiling point above 150° C. and a conjugated acid of B has a pKa value above 10. Particularly preferred examples include guanidine compounds, cyclic guanidine compounds, amidine compounds, cyclic amidine compounds and hydroxytetraalkylammonium compounds.

Preferred examples of B include compounds described below: dimethylamine, diethylamine, piperidine, piperazine, ethylenediamine, N,N'-dimethylethylenediamine, acetamidine, diazabicyclononene, diazabicycloundecene, hydroxytetramethylammonium, hydroxytetraethylammonium,

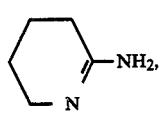 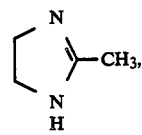

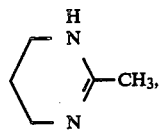 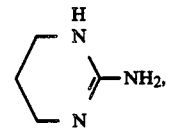

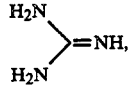 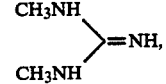

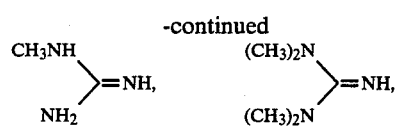
and so on.
Specific examples of the base precursor preferably used in the present invention are illustrated below:
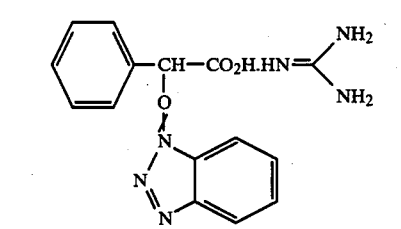   (1)
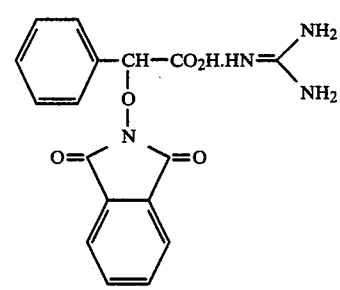   (2)
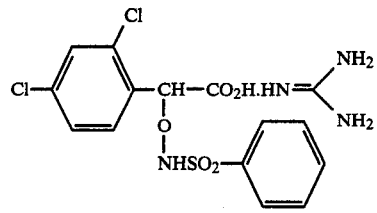   (3)
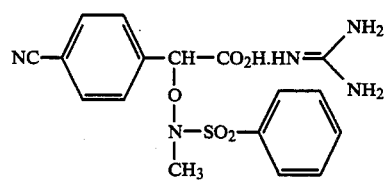   (4)
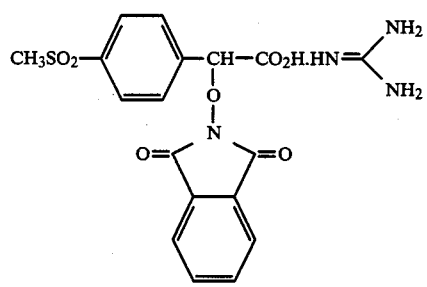   (5)
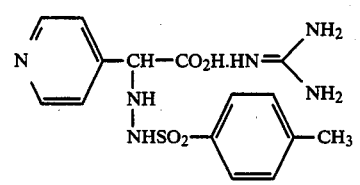   (6)
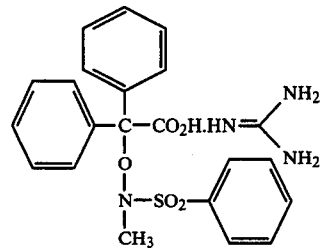   (7)
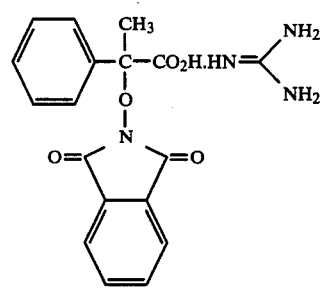   (8)
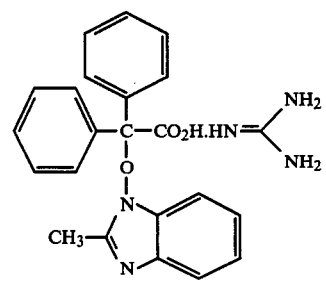   (9)
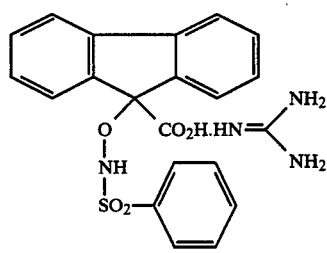   (10)
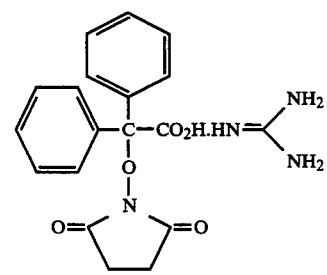   (11)

-continued
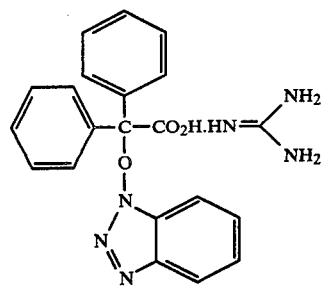
(12)
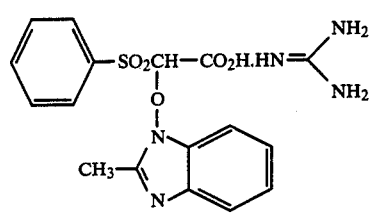
(13)
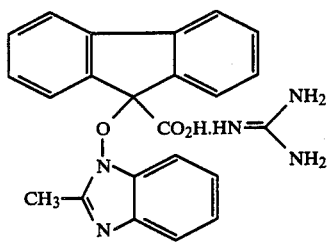
(14)
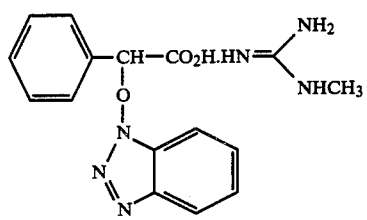
(15)
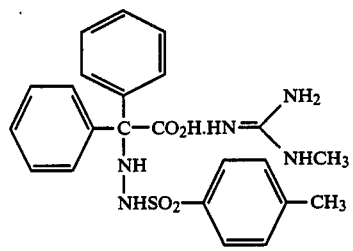
(16)
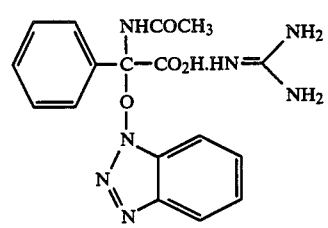
(17)
-continued
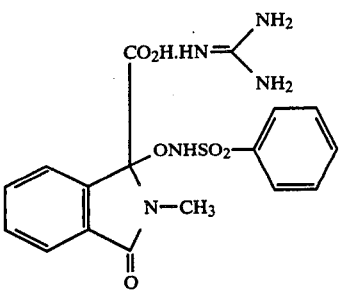
(18)
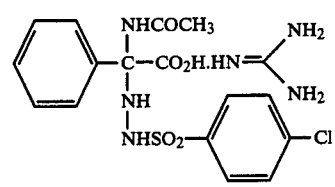
(19)
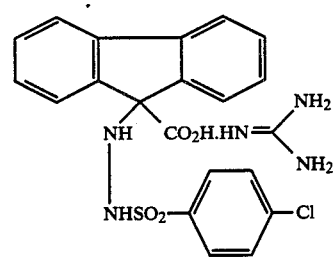
(20)
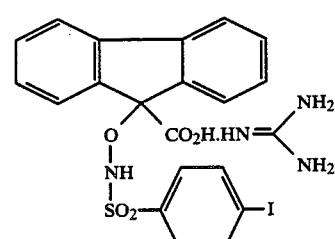
(21)
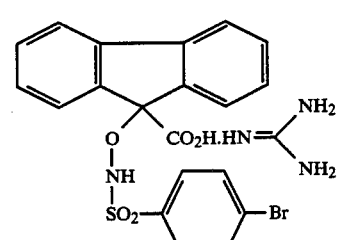
(22)
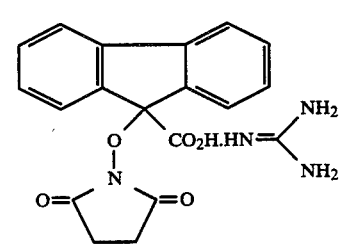
(23)

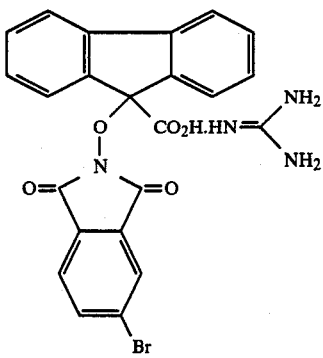

(24)

The base precursor of the present invention can generally be synthesized by a method according to the following scheme.

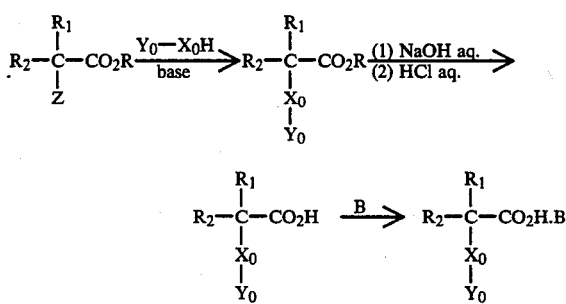

In the above scheme, $R_1$, $R_2$, $X_0$, $Y_0$ and B are as described previously; Z represents a halogen atom or a sulfonyloxy group; R represents a lower alkyl group. Sodium alkoxide, hydrogenated sodium and anhydrous potassium carbonate, etc., are generally used as a base.

A specific example of a method for synthesis of the base precursor of the present invention is described below.

SYNTHESIS EXAMPLE

Synthesis of Base Precursor (7)

A mixture of 37.4 g (0.2 mol) of N-methylbenzenesulfohydroxamic acid, 52.1 g (0.2 mol) of diphenylchloroacetyloxymethyl, 27.6 g of anhydrous potassium carbonate and 200 ml of N,N-dimethylacetamide were stirred at 50° C. for 3 hours. The reaction solution was slowly poured into 1 l of cool diluted hydrochloric acid and the formed precipitate was filtrated out. The obtained precipitate was little by little added into 500 ml of 2N sodium hydroxide and then the mixture was stirred at room temperature for 2 hours. The mixture was neutralized with dilute hydrochloric acid (2N) while cooling with ice. A pale brown precipitate was formed and filtrated and washed with water. The crude product was recrystallized from methanol and 44.5 g of a free acid having a melting point of from 134° C. to 138° C., which is a component part of Base Precursor (7), was obtained.

39.7 g of this crystalline substance was added to 500 ml of methanol and 50 ml of an aqueous solution containing 9.0 g of guanidinecarbonate was slowly added to the above solution. The solution was stirred at room temperature for 1 hour and then a solvent was removed at below 50° C. while reducing the pressure. Isopropanol was added to the residue. The precipitate was filtrated out and dried to obtain 44 g of white crystals of Base Precursor (7) having a melting point of from 154° C. to 157° C. (decomposition).

The other base precursors were synthesized in the same way as above.

The base precursor according to the present invention is especially effective when it is employed together with a spectrally sensitized light-sensitive silver halide emulsion, and in particular the degree of increase in image density is particularly large in this case.

The spectral sensitization of silver halide emulsions can be performed using methine dyes or other dyes. Suitable dyes which can be employed include cyanine dyes, merocyanine dyes, complex cyanine dyes, complex merocyanine dyes, holopolar cyanine dyes, hemicyanine dyes, styryl dyes and hemioxonol dyes. Of these dyes, cyanine dyes, merocyanine dyes and complex merocyanine dyes are particularly useful. Any conventionally utilized nucleus for cyanine dyes, such as a basic heterocyclic nucleus, is applicable to dyes useful in the present invention, including a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus or a pyridine nucleus. Furthermore, nuclei formed by condensing alicyclic hydrocarbon rings with these nuclei and nuclei formed by condensing aromatic hydrocarbon rings with these nuclei, e.g., an indolenine nucleus, a benzindolenine nucleus, an indole nucleus, a benzoxazole nucleus, a naphthoxazole nucleus, a benzothiazole nucleus, a naphthothiazole nucleus, a benzoselenazole nucleus, a benzimidazole nucleus or a quinoline nucleus may also be used. The carbon atoms of these nuclei may be substituted.

In merocyanine dyes and complex merocyanine dyes, nuclei having a ketomethylene structure can include 5- or 6-membered heterocyclic nuclei such as a pyrazolin-5-one nucleus, a thiohydantoin nucleus, a 2-thiooxazolidin-2,4-dione nucleus, a thiazolidin-2,4-dione nucleus, a rhodanine nucleus or a thiobarbituric acid nucleus.

These sensitizing dyes can be employed individually and can also be employed in combination thereof. A combination of sensitizing dyes is often used, particularly for the purpose of supersensitization.

Useful sensitizing dyes include those described in German Pat. No. 929,080, U.S. Pat. Nos. 2,493,748, 2,503,776, 2,519,001, 2,912,329, 3,656,959, 3,672,897, 3,694,217, 4,025,349 and 4,046,572, British Pat. No. 1,242,588, and Japanese Patent Publication Nos. 14030/69 and 24844/77.

A suitable amount of the sensitizing dye to be used is from about 0.001 g to 20 g, and preferably from about 0.01 g to 2 g, per 100 g of silver contained in the emulsion.

The amount of base precursor according to the present invention used can vary in a broad range. It is suitably used in an amount of about 50% by weight or less, and more preferably in a range from about 0.01% by weight to 40% by weight, based on the total weight of dried coatings of the light-sensitive material.

Any unit and layer structure can be applied to the light-sensitive material of the present invention. The base precursor may be incorporated into any one of various layers of the light-sensitive material. When a light-sensitive emulsion layer and a layer containing a dye providing substance are separately constructed, the base precursor may be incorporated into any of these layers. Further, it can be incorporated into an interlayer or a protective layer.

Moreover, two or more base precursors according to the present invention can be used.

In the present invention, silver halide as a light-sensitive substance is preferably employed.

The silver halide used in the present invention can be any conventional light-sensitive silver halide, including silver chloride, silver chlorobromide, silver chloroiodide, silver bromide, silver iodobromide, silver chloroiodobromide and silver iodide.

Any conventional process for preparing those silver halides can be used, such as a typical method of preparing silver iodobromide by first adding a silver nitrate solution to a potassium bromide solution to form silver bromide particles and then adding potassium iodide to the mixture.

Two or more silver halides in which the particle size and/or halogen composition are different from each other may be used in combination.

The average particle size of the silver halide used in the present invention is preferably from about 0.001 $\mu$m to 10 $\mu$m and more preferably from about 0.001 $\mu$m to 5 $\mu$m.

The silver halide used in the present invention may be unsensitized or chemically sensitized with a conventional chemical sensitizing agent such as compounds of sulfur, selenium or tellurium, or compounds of gold, platinum, palladium, rhodium or iridium, a reducing agent such as tin halide, or a combination thereof. The details of suitable sensitization methods are described in T. H. James, *The Theory of the Photograhic Process*, pages 149 to 169 (4th Ed. 1977).

A suitable coating amount of the light-sensitive silver halide according to the present invention is from about 1 mg to 10 g/m$^2$ calculated as silver.

In a particularly preferred embodiment of the heat developable light-sensitive material according to the present invention, an organic silver salt oxidizing agent is used together with silver halide. The organic silver salt oxidizing agent is a silver salt which forms a silver image by reacting with the hereinafter described reductive dye providing substance or with optional reducing agents present together with the image forming substances, when it is heated to a temperature of above about 80° C. and preferably above about 100° C. in the presence of exposed silver halide. Combined use of such an organic silver salt oxidizing agent, the light-sensitive material which provides higher color density can be obtained.

The silver halide used in conjunction with an organic silver salt oxidizing agent does not necessarily contain pure silver iodide crystal in the case of using the silver halide alone. Any silver halide which is known in the art can be used.

Examples of such organic silver salt oxidizing agents include those described in U.S. Pat. No. 4,500,626, and specifically include the following.

A silver salt of an organic compound having a carboxy group can be used, including a silver salt of an aliphatic carboxylic acid and a silver salt of an aromatic carboxylic acid.

In addition, a silver salt of a compound containing a mercapto group or a thione group or a derivative thereof can be used.

Further, a silver salt of a compound containing an imino group can be used, including a silver salt of benzotriazole and a derivative thereof described in Japanese Patent Publication No. 30270/69 and U.S. Pat. No. 3,635,719, e.g., a silver salt of benzotriazole, a silver salt of an alkyl-substituted benzotriazole such as a silver salt of methylbenzotriazole, a silver salt of a halogen-substituted benzotriazole such as a silver salt of 5-chlorobenzotriazole, a silver salt of carboimidobenzotriazole such as a silver salt of butylcarboimidobenzotriazole, a silver salt of 1,2,4-triazole or 1-H-tetrazole as described in U.S. Pat. No. 4,220,709, a silver salt of carbazole, a silver salt of saccharin, a silver salt of imidazole and an imidazole derivative.

Moreover, a silver salt as described in *Research Disclosure*, Vol. 170, No. 17029 and an organic metal salt such as copper stearate can be used as organic metal salt ozidizing agents in the present invention.

Methods of preparing these silver halide and organic silver salt oxidizing agents and methods of blending them are described in *Research Disclosure*, No. 17029, Japanese Patent Application (OPI) Nos. 42529/76, 13224/74 and 17216/75 and U.S. Pat. Nos. 3,700,458 and 4,076,539.

A suitable coating amount of the light-sensitive silver halide and the organic silver salt oxidizing agent employed in the present invention is a total of from about 50 mg/m$^2$ to 10 g/m$^2$ calculated as silver.

In the present invention, a wide variety of image forming substances can be used in addition to silver as an image forming substance.

For instance, couplers capable of forming color images by bonding to oxidation products of developing agents employed in conventional liquid development processing can be used in the present invention, with specific examples including magenta couplers such as 5-pyrazolone couplers, pyrazolobenzimidazole couplers, cyanoacetylcumarone couplers and open chain acylacetonitrile couplers, yellow couplers such as acylacetamide couplers (e.g., benzoylacetanilides and pivaloylacetanilides), and cyan couplers such as naphthol couplers and phenol couplers.

It is generally desirable that these couplers should be rendered nondiffusible by a hydrophobic group (i.e., a "ballast group") in their molecules, so that the couplers should be polymeric couplers. The couplers may be either 4-equivalent or 2-equivalent with respect to silver ion. Further, these couplers may be colored couplers having a color correction effect, or couplers capable of releasing development inhibitors upon development (i.e., "DIR couplers").

In addition, dyes which can produce positive color images using light-sensitive silver dye bleach processes, for example, dyes described in *Research Disclosure*, pages 30–32, RD-14433 (April, 1976), *Research Disclosure*, pages 14–15, RD-15227 (December, 1976), and U.S. Pat. No. 4,235,957, and leuco dyes described in U.S. Pat. Nos. 3,985,565 and 4,022,617, can be used.

Also, dyes into which nitrogen-containing heterocyclic groups are introduced described in *Research Disclosure*, pages 54–58, RD-16966 (May, 1978) can be used.

Moreover, dye providing substances described in European Pat. Nos. 67,455 and 79,056, West German Pat. No. 3,217,853, which release mobile dyes by a coupling reaction with reducing agents oxidized by a redox reaction with silver halide or organic silver salt oxidizing agents under high temperatures, and dye providing substances described in European Pat. Nos. 66,282 and 76,492, West German Pat. Nos. 3,215,485, and Japanese Patent Application (OPI) Nos. 154445/84 and 152440/84, which undergo a redox reaction with silver halide or organic silver salt oxidizing agents under high temperatures, and release mobile dyes as a result of this reaction, can be used.

Dye providing substances which can be used in the above described processes are preferably represented by the following formula (CI):

$$(Dye-X)_q-Y \qquad (CI)$$

wherein Dye represents a dye which becomes mobile when it is released from the molecule of the compound represented by the formula (CI); X represents a simple bond or a connecting group; q represents 1; and Y represents a group which releases Dye in correspondence or counter-correspondence to light-sensitive silver salts having a latent image distributed imagewise, the diffusibility of a dye released being different from that of the compound represented by $(Dye-X)_q-Y$.

The dye represented by Dye is preferably a dye having a hydrophilic group. Examples of the dye which can be used include azo dyes, azomethine dyes, anthraquinone dyes, naphthoquinone dyes, styryl dyes, nitro dyes, quinoline dyes, carbonyl dyes and phthalocyanine dyes. These dyes can also be used in a color-shifted form having temporarily shorter wavelengths, the original color of which is recoverable in development processing.

More specifically, dyes described in European Pat. No. 76,492 can be utilized.

Examples of the connecting group represented by X include —NR— (wherein R represents a hydrogen atom, an alkyl group, or a substituted alkyl group), —SO$_2$—, —CO—, an alkylene group, a substituted alkylene group, a phenylene group, a substituted phenylene group, a naphthylene group, a substituted naphthylene group, —O—, —SO—, or a group containing two or more of the foregoing groups in combination.

In the following, preferred embodiments of Y in formula (CI) are described in greater detail.

In one embodiment, Y is selected so that the compound represented by the general formula (CI) is a nondiffusible image forming compound which is oxidized as a result of development, thereby undergoing self-cleavage and releasing a diffusible dye.

An example of Y which is effective for compounds of this type is an N-substituted sulfamoyl group. For example, a group represented by formula (CII) is illustrated for Y.

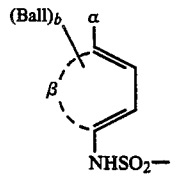

(CII)

wherein β represents non-metallic atoms necessary for forming a benzene ring, which may optionally be condensed with a carbon ring or a hetero ring to form, for example, a naphthalene ring, a quinoline ring, a 5,6,7,8-tetrahydronaphthalene ring, a chroman ring or the like; α represents a group of —OG$^{11}$ or —NHG$^{12}$ (wherein G$^{11}$ represents hydrogen or a group which forms a hydroxyl group upon being hydrolyzed, and G$^{12}$ represents hydrogen, an alkyl group containing 1 to 22 carbon atoms or a hydrolyzable group);

Ball represents a ballast group; and b represents an integer of 0, 1 or 2.

Specific examples of this type of Y are described in Japanese Patent Application (OPI) Nos. 33826/73 and 50736/78.

Other examples of Y suited for this type of compound are those represented by the following general formula (CIII):

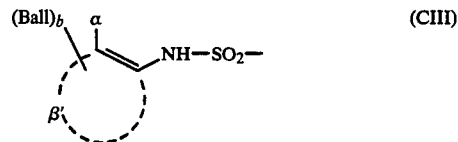

(CIII)

wherein Ball, α and b are the same as defined with (CII), β' represents atoms necessary for forming a carbon ring (e.g., a benzene ring which may be condensed with another carbon ring or a hetero ring to form a naphthalene ring, quinoline ring, 5,6,7,8-tetrahydronaphthalene ring, chroman ring or the like. Specific examples of this type of Y are described in Japanese Patent Application (OPI) Nos. 113624/76, 12642/81, 16131/81, 16130/81, 4043/82 and 650/82 and U.S. Pat. No. 4,053,312.

Further examples of Y suited for this type of compound are those represented by the following formula (CIV):

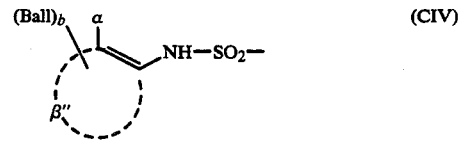

(CIV)

wherein Ball, α and b are the same as defined with the formula (CII), and β" represents atoms necessary for forming a hetero ring such as a pyrazole ring, a pyridine ring or the like, said hetero ring being optionally bound to a carbon ring or a hetero ring. Specific examples of this type of Y are described in Japanese Patent Application (OPI) No. 104343/76.

Still further examples of Y suited for this type of compound are those represented by the following formula (CV):

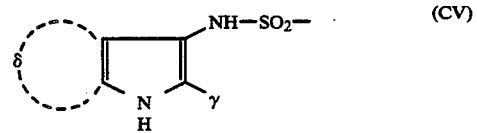

(CV)

wherein γ preferably represents hydrogen, a substituted or unsubstituted alkyl, aryl or heterocyclic group, or —CO—G$^{21}$; G$^{21}$ represents —OG$^{22}$, —SG$^{22}$ or

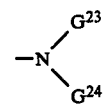

(wherein G$^{22}$ represents hydrogen, an alkyl group, a cycloalkyl group or an aryl group, G$^{23}$ is the same as defined for said G$^{22}$, or G$^{23}$ represents an acyl group derived from an aliphatic or aromatic carboxylic or sulfonic acid, and G$^{24}$ represents hydrogen or an unsubstituted or substituted alkyl group); and δ represents a residue necessary for completing a condensed benzene ring.

Specific examples of this type of Y are described in Japanese Patent Application (OPI) Nos. 104343/76, 46730/78, 130122/79 and 85055/82.

Still further examples of Y suited for this type of compound are those represented by the formula (CVI):

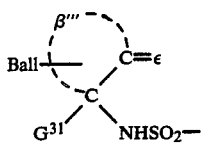 (CVI)

wherein Ball is the same as defined with the formula (CII); $\epsilon$ represents an oxygen atom or $=NG^{32}$ (wherein $G^{32}$ represents hydroxyl or an optionally substituted amino group) (examples of $H_2N-G^{32}$ to be used for forming the group of $=NG^{32}$ including hydroxylamine, hydrazines, semicarbazides, thiosemicarbazides, etc.); $\beta'''$ represents a saturated or unsaturated nonaromatic 5-, 6- or 7-membered hydrocarbon ring; and $G^{31}$ represents hydrogen or a halogen atom (e.g., a fluorine atom, a chlorine atom, a bromine atom, etc.).

Specific examples of this type of Y are described in Japanese Patent Application (OPI) Nos. 3819/78 and 48534/79.

Other examples of Y of this type of compound are described in Japanese Patent Publication Nos. 32129/73, 39165/73, Japanese Patent Application (OPI) No. 64436/74, U.S. Pat. No. 3,443,934, etc.

Still further examples of Y are those represented by the following formula (CVII):

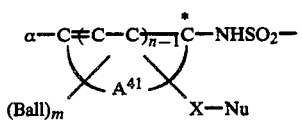 (CVII)

wherein $\alpha$ represents $OR^{41}$ or $NHR^{42}$; $R^{41}$ represents hydrogen or a hydrolyzable component; $R^{42}$ represents hydrogen, an alkyl group containing 1 to 50 carbon atoms or a hydrolyzable group; $A^{41}$ represents atoms necessary for forming an aromatic ring; Ball represents an organic immobile group existing on the aromatic ring, with Ball's being the same or different from each other; m represents an integer of 1 or 2; X represents a divalent organic group having 1 to 8 atoms, with the nucleophilic group (Nu) and an electrophilic center (asterisked carbon atom) formed by oxidation forming a 5- to 12-membered ring; Nu represents a nucleophilic group; n represents an integer of 1 or 2; and $\alpha$ may be the same as defined with the above described formula (CII). Specific examples of this type of Y are described in Japanese Patent Application (OPI) No. 20735/82.

As still further type of examples represented by the formula (CI), there are dye providing nondiffusible substances which release a diffusible dye in the presence of a base as a result of self cyclization or the like but which, when reacted with an oxidation product of a developing agent, substantially never release the dye.

Examples of Y effective for this type of compound are those which are represented by the formula (CVIII):

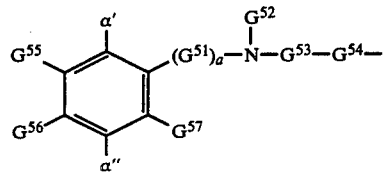 (CVIII)

wherein $\alpha'$ represents an oxidizable nucleophilic group (e.g., a hydroxy group, a primary or secondary amino group, a hydroxyamino group, a sulfonamido group or the like) or a precursor thereof;

$\alpha''$ represents a dialkylamino group or an optional group defined for $\alpha'$;

$G^{51}$ represents an alkylene group having 1 to 3 carbon atoms;

a represents 0 or 1;

$G^{52}$ represents a substituted or unsubstituted alkyl group having 1 to 40 carbon atoms or a substituted or unsubstituted aryl group having 6 to 40 carbon atoms;

$G^{53}$ represents an electrophilic group such as —CO— or —CS—;

$G^{54}$ represents an oxygen atom, a sulfur atom, a selenium atom, a nitrogen atom or the like and, when $G^{54}$ represents a nitrogen atom, it has hydrogen or may be substituted by an alkyl or substituted alkyl group having 1 to 10 carbon atoms or an aromatic residue having 6 to 20 carbon atoms; and $G^{55}$, $G^{56}$ and $G^{57}$ each represents hydrogen, a halogen atom, a carbonyl group, a sulfamyl group, a sulfonamido group, an alkyloxy group having 1 to 40 carbon atoms or an optional group defined for $G^{52}$, $G^{55}$ and $G^{56}$ may form a 5- to 7-membered ring, and $G^{56}$ may represent

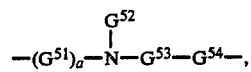

with the proviso that at least one of $G^{52}$, $G^{55}$, $G^{56}$ and $G^{57}$ represents a ballast group. Specific examples of this type of Y are described in Japanese Patent Application (OPI) No. 63618/76.

Further examples of Y suited for this type of compound are those which are represented by the following general formulae (CIX) and (CX):

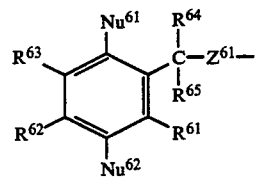 (CIX)

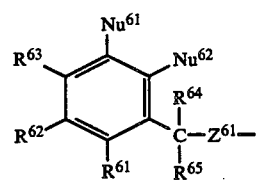 (CX)

wherein $Nu^{61}$ and $Nu^{62}$, which may be the same or different, each represents a nucleophilic group or a precursor thereof; $Z^{61}$ represents a divalent atom group which is electrically negative with respect to the carbon atom substituted by $R^{64}$ and $R^{65}$; $R^{61}$, $R^{62}$ and $R^{63}$ each represents hydrogen, a halogen atom, an alkyl group, an alkoxy group or an acylamino group or, when located at adjacent positions on the ring, $R^{61}$ and $R^{62}$ may form a condensed ring together with the rest of the molecule, or $R^{62}$ and $R^{63}$ may form a condensed ring together with the rest of the molecule; $R^{64}$ and $R^{65}$, which may be the same or different, each represents hydrogen, a hydrocarbon group or a substituted hydrocarbon group; with at least one of the substituents, $R^{61}$, $R^{62}$, $R^{63}$, $R^{64}$ and $R^{65}$ having a ballast group, Ball, of an enough size so as to render the above described compounds immobile. Specific examples of this type of Y are described in Japanese Patent Application (OPI) Nos. 69033/78 and 130927/79.

Further examples of Y suited for this type of compound are those which are represented by the formula (CXI):

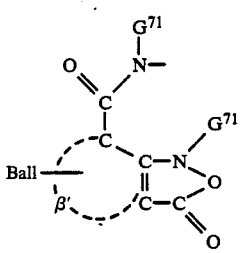
(CXI)

wherein Ball and $\beta'$ are the same as defined for those in formula (CIII), and $G^{71}$ represents an alkyl group (including a substituted alkyl group). Specific examples of this type of Y are described in Japanese Patent Application (OPI) Nos. 111628/74 and 4819/77.

As different type of compound represented by the general formula (CI), there are illustrated dye providing nondiffusible substances which themselves do not release any dye but, upon reaction with a reducing agent, release a dye. With these compounds, compounds which mediate the redox reaction (called electron donors) are preferably used in combination.

Examples of Y effective for this type of compound are those represented by the formula (CXII):

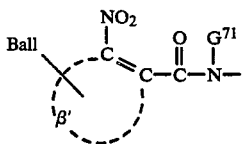
(CXII)

wherein Ball and $\beta'$ are the same as defined for those in the general formula (CIII), and $G^{71}$ represents an alkyl group (including a substituted alkyl group). Specific examples of this type of Y are described in Japanese Patent Application (OPI) Nos. 35533/78 and 110827/78.

Further examples of Y suited for this type of compound are those which are represented by (CXIII):

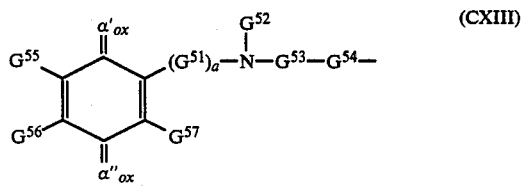
(CXIII)

wherein $\alpha'_{ox}$ nad $\alpha''_{ox}$ represent groups capable of giving $\alpha'$ and $\alpha''$, respectively, upon reduction, and $\alpha'$, $\alpha''$, $G^{51}$ $G^{52}$, $G^{53}$, $G^{54}$, $G^{55}$, $G^{56}$, $G^{57}$ and a are the same as defined with respect to formula (CVIII). Specific examples of Y described above are described in Japanese Patent Application (OPI) No. 110827/78, U.S. Pat. Nos. 4,356,249 and 4,358,525.

Further examples of Y suited for this type of compound are those which are represented by the formulae (CXIV-A) and (CXIV-B):

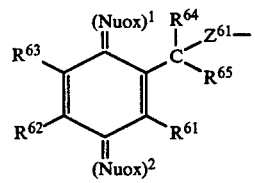
(CXIV-A)

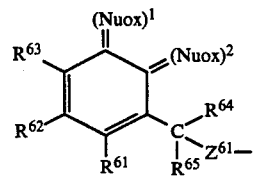
(CXIV-B)

wherein (Nuox)$^1$ and (Nuox)$^2$, which may be the same or different, each represents an oxidized nucleophilic group, and other notations are the same as defined with respect to the formulae (CIX) and (CX). Specific examples of this type of Y are described in Japanese Patent Application (OPI) Nos. 130927/79 and 164342/81.

The publicly known documents have been referred to with respect to (CXII), (CXIII), (CXIV-A) and (CXIV-B) describe electron donors to be used in combination.

As still further different type of compound represented by the general formula (CI), there are illustrated LDA compounds (Linked Donor Acceptor Compounds). These compounds are dye providing non-diffusible substances which cause donor-acceptor reaction in the presence of a base to release a diffusible dye but, upon reaction with an oxidation product of a developing agent, they substantially do not release the dye any more.

Examples of Y effective for this type of compound are those represented by the formula (CXV) (specific examples thereof being described in Japanese Patent Application (OPI) No. 60289/83):

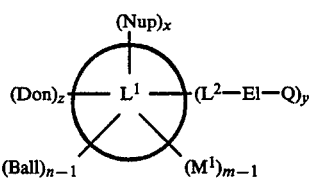
(CXV)

wherein n, x, y and z each represents 1 or 2, m represents an integer of 1 or more; Don represents a group containing an electron donor or its precursor moiety; $L^1$ represents an organic group linking Nup to —El—Q or Don; Nup represents a precursor of a nucleophilic group; El represents an electrophilic center; Q represents a divalent group; Ball represents a ballast group; $L^2$ represents a linking group; and $M^1$ represents an optional substituent.

The ballast group is an organic ballast group which can render the dye providing substance non-diffusible, and is preferably a group containing a $C_{8-32}$ hydrophobic group. Such organic ballast group is bound to the dye providing substance directly or through a linking group (e.g., an imino bond, an ether bond, a thioether bond, a carbonamido bond, a sulfonamido bond, a ureido bond, an ester bond, an imido bond, a carbamoyl bond, a sulfamoyl bond, etc., and combination thereof).

Two or more kinds of the dye providing substances can be employed together. In such a case two or more kinds of the dye providing substances may be used together in order to provide the same hue or in order to reproduce black color.

Specific examples of dye image forming substances which can be used in the present invention are described in the patents cited hereinbefore. Since length prevents illustrating all preferred examples thereof, only a portion thereof is described hereinafter. Specific examples of the dye providing substances represented by general formula (CI) are set forth below.

CI-1
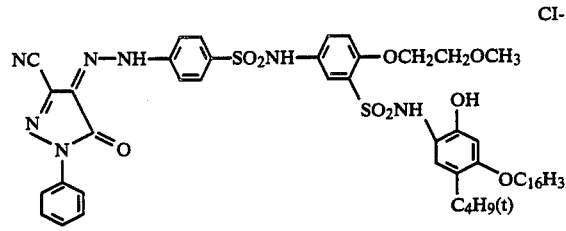

CI-2
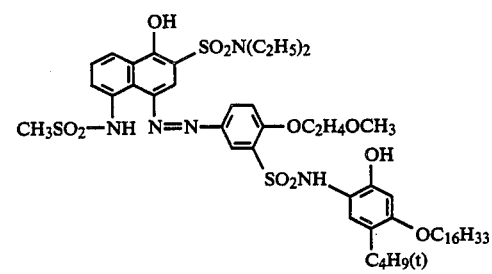

CI-3
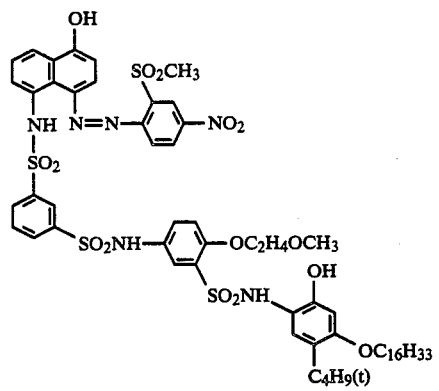

CI-4
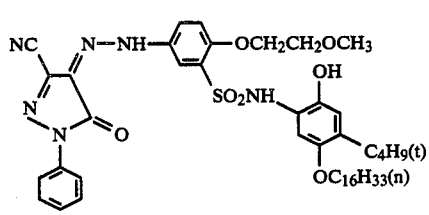

CI-5
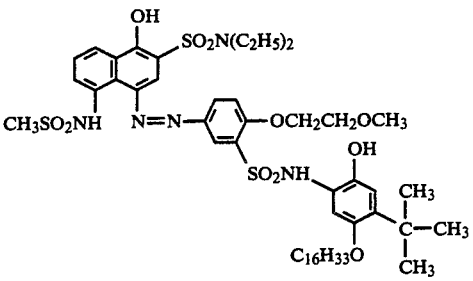

CI-6
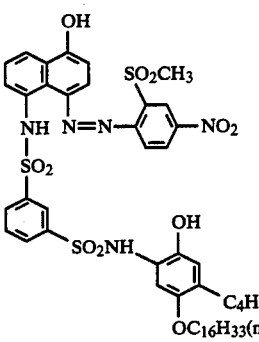

CI-7

CI-8

CI-9

-continued

CI-10
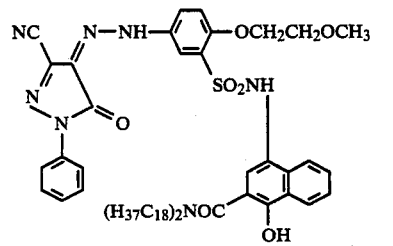

CI-11
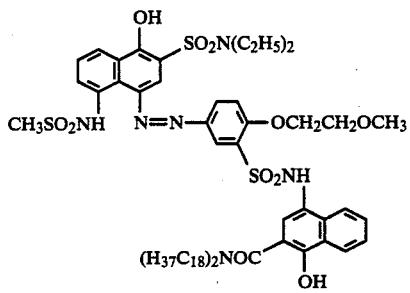

CI-12
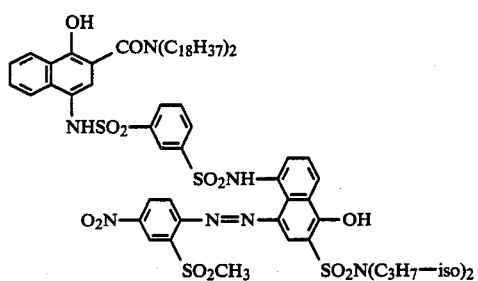

CI-13
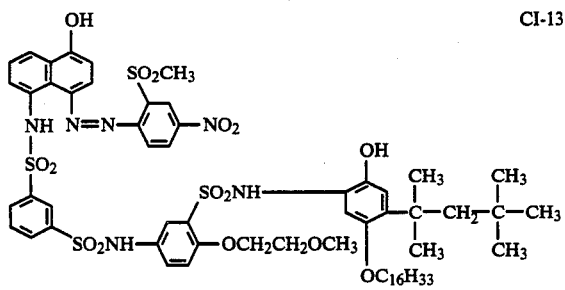

CI-14
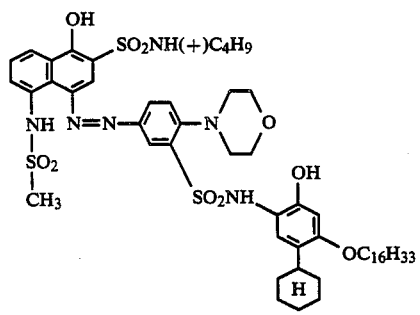

CI-15
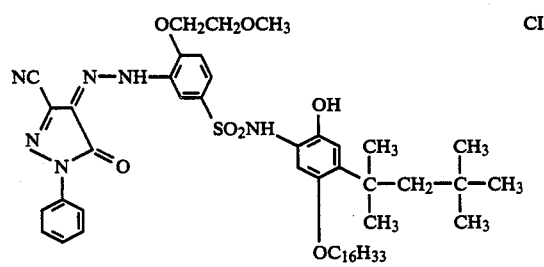

-continued

CI-16
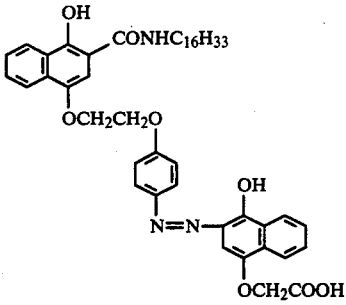

The above described compounds are only given as examples and the present invention should not be construed as being limited thereto.

Many of the above described substances form an imagewise distribution of mobile dyes corresponding to exposure in a light-sensitive material by heat development, and methods for transferring these image dyes into a dye fixing material (so-called diffusion transfer) to produce images are described in the above described patents and Japanese Patent Application (OPI) Nos. 168439/84 and 182447/84.

The dye providing substance used in the present invention can be introduced into a layer of the light-sensitive material by known methods such as the method as described in U.S. Pat. No. 2,322,027, such as by using an organic solvent having a high boiling point or an organic solvent having a low boiling point as described in the Examples.

For example, the dye providing substance is dispersed in a hydrophilic colloid after dissolved in an organic solvent having a high boiling point, for example, a phthalic acid alkyl ester (for example, dibutyl phthalate, dioctyl phthalate, etc.), a phosphoric acid ester (for example, diphenyl phosphate, triphenyl phosphate, tricresyl phosphate, dioctylbutyl phosphate, etc.), a citric acid ester (for example, tributyl acetylcitrate, etc.), a benzoic acid ester (for example, octyl benzoate, etc.), an alkylamide (for example, diethyl laurylamide, etc.), an aliphatic acid ester (for example, dibutoxyethyl succinate, dioctyl azelate, etc.), a trimesic acid ester (for example, tributyl trimesate, etc.), etc., or an organic solvent having a boiling point of about 30° C. to 160° C., for example, a lower alkyl acetate such as ethyl acetate, butyl acetate, etc., ethyl propionate, secondary butyl alcohol, methyl isobutyl ketone, β-ethoxyethyl acetate, methyl cellosolve acetate, cyclohexanone, etc. The above described organic solvents having a high boiling point and organic solvents having a low boiling point may be used as a mixture thereof.

Further, it is possible to use a dispersion method using a polymer as described in Japanese Patent Publication No. 39853/76 and Japanese Patent Application (OPI) No. 59943/76. Moreover, various surface active agents can be used when the dye providing substance is dispersed in a hydrophilic colloid. For this purpose, the surface active agents illustrated in other part of the specification can be used. An amount of high boiling point organic solvent used in the present invention is 10 g or less, and preferably 5 g or less, per gram of the dye providing substance.

In the present invention, if necessary, a reducing agent may be used. The reducing agents used in the present invention include the following compounds.

Hydroquinone compunds (for example, hydroquinone, 2,5-dichlorohydroquinone, 2-chlorohydroquinone, etc.), aminophenol compounds (for example, 4-aminophenol, N-methylaminophenol, 3-methyl-4-aminophenol, 3,5-dibromoaminophenol, etc.), catechol compounds (for example, catechol, 4-cyclohexylcatechol, 3-methoxycatechol, 4-(N-octadecylamino)catechol, etc.), phenylenediamine compounds (for example, N,N-diethyl-p-phenylenediamine, 3-methyl-N,N-diethyl-p-phenylenediamine, 3-methoxy-N-ethyl-N-ethoxy-p-phenylenediamine, N,N,N',N'-tetramethyl-p-phenylenediamine, etc.).

Various combinations of developing agents as described in U.S. Pat. No. 3,039,869 can also be used.

In the present invention, an amount of the reducing agent added is from 0.01 mol to 20 mols per mol of silver and more preferably from 0.1 mol to 10 mols per mol of silver.

In the present invention various dye releasing activators can be used. These dye releasing activators of the present invention are compounds which are basic and are capable of accelerating development, or so-called nucelophilic compounds. Namely, bases or base precursors are used.

Although base precursors of the present invention can be used as a dye releasing activator, other bases or base precursors can also be incorporated.

The dye releasing activator can be incorporated in the light-sensitive material or a dye fixing material. In the case that the dye releasing activator is incorporated in the light-sensitive material, it is advantageous to use a base precursor.

In the present invention various development stopping agents can be used in order to always obtain constant image regardless of any changes of processing temperature and processing time in heat development.

These development stopping agents mean compounds capable of neutralizing a base or capable of reacting with a base to reduce the basicity in layer immediately after completion of appropriate development. In the concrete, acid precursors releasing an acid by heating, or compounds reacting with a base coexisting by heating are used as a development stopping agent. For example, the embodiments of the acid precursor include oxime esters as described in Japanese Patent Application Nos. 216928/83 and 48305/84, and compounds releasing an acid due to Lossen rearrangement as described in Japanese Patent Application No. 85834/84. The compounds reacting with a base by heating are described in Japanese Patent Application No. 85836/84.

When base precursors are used, the most excellent effect of a development stopping agent is obtained. In that case, the mole ratio of a base precursor/an acid precursor is from 1/20 to 20/1, and preferably from 1/5 to 5/1.

The binder which can be used in the present invention can be employed alone or in a combination thereof. A hydrophilic binder can be used as the binder according to the present invention. The typical hydrophilic binder is a transparent or translucent hydrophilic binder, examples of which include a natural substance, for example, protein such as gelatin, a gelatin derivative, etc., a polysaccharide such as starch, gum arabic, a cellulose derivative, etc., and a synthetic polymer, for example, a water-soluble polyvinyl compound such as polyvinyl alcohol, polyvinylpyrrolidone, acrylamide polymer, etc. Another example of the synthetic polymer compound is a dispersed vinyl compound in a latex form which is used for the purpose of increasing dimensional stability of a photographic material.

Further, in the present invention, it is possible to use a compound which activates development simultaneously while stabilizing the image. Particularly, it is preferred to use isothiuroniums including 2-hydroxyethylisothiuronium trichloroacetate as described in U.S. Pat. No. 3,301,678, bisisothiuroniums including 1,8-(3,6-dioxaoctane)-bis(isothiuronium trifluoroacetate), etc., as described in U.S. Pat. No. 3,669,670, thiol compounds as described in German Patent Application (OLS) No. 2,162,714, thiazolium compounds such as 2-amino-2-thiazolium trichloroacetate, 2-amino-5-bromoethyl-2-thiazolium trichloroacetate, etc., as described in U.S. Pat. No. 4,012,260, compounds having α-sulfonylacetate as an acid part such as bis(2-amino-2-thiazolium)methylenebis(sulfonylacetate), 2-amino-2-thiazolium phenylsulfonylacetate, etc., as described in U.S. Pat. No. 4,060,420, and compounds having 2-carboxycarboxamide as an acid part as described in U.S. Pat. No. 4,088,496.

Furthermore, it is also preferred to use azolthioether and blocked azoline thione compound as described in Belgian Pat. No. 768,071, 4-aryl-1-carbamyl-2-tetrazoline-5-thione compound as described in U.S. Pat. No. 3,893,859, and compounds as described in U.S. Pat. Nos. 3,839,041, 3,844,788 and 3,877,940.

The photosensitive material of the present invention can contain a toning agent as occasion arises. Effective toning agents are 1,2,4-triazoles, 1H-tetrazoles, thiouracils, 1,3,4-thiadiazoles, and like compounds. Examples of preferred toning agents include 5-amino-1,3,4-thiadiazole-2-thiol, 3-mercapto-1,2,4-triazole, bis(dimethylcarbamyl)disulfide, 6-methylthiouracil, 1-phenyl-2-tetrazoline-5-thione, and the like. Particularly effective toning agents are compounds which can impart a black color tone to images.

The content of such a toning agent as described above, though depending upon the kind of a heat developable photosensitive material used, processing conditions, desired images and various other factors, generally ranges from about 0.001 to 0.1 mol per mol of silver in the photosensitive material.

The above described various ingredients to constitute a heat developable photosensitive material can be arranged in arbitrary positions, if desired. For instance, one or more of the ingredients can be incorporated in one or more of the constituent layers of a photosensitive material, if desired. In some cases, it is desired that particular portions of reducing agent, image stabilizing agent and/or other additives should be distributed in a protective layer. As a result of the distribution in the above described manner, migration of additives among constituent layers of a heat developable photosensitive material can be reduced. Therefore, such distribution of additives is of advantage to some cases.

The heat developable photosensitive materials of the present invention are effective in forming both negative and positive images. The negative or positive image can be formed depending mainly on the type of the light-sensitive silver halide. For instance, in order to produce direct positive images, internal image type silver halide emulsions described in U.S. Pat. Nos. 2,592,250, 3,206,313, 3,367,778 and 3,447,927, or mixtures of surface image type silver halide emulsions with internal image type silver halide emulsions as described in U.S. Pat. No. 2,996,382 can be used.

Various means of exposure can be used in the present invention. Latent images are obtained by image-wise exposure by radiant rays including visible rays. Generally, light sources used for conventional color prints can be used, examples of which include sunlight, flash lamp, strobo light, tungsten lamps, mercury lamps, halogen lamps such as iodine lamps, xenon lamps, laser light sources, CRT light sources, plasma light sources, fluorescent tubes and light emitting diodes, etc.

In the present invention, after the heat developable color photographic material is exposed to light, the resulting latent image can be developed by heating the whole material to a suitably elevated temperature.

As the heating means, a simple heat plate, iron, heat roller, heat generator utilizing carbon or titanium white, etc., or analogues thereof may be used.

A support used in the light-sensitive material and the dye fixing material employed, if desired, according to the present invention is that which can endure at the processing temperature. As an ordinary support, not only glass, paper, metal or analogues thereof may be used, but also an acetyl cellulose film, a cellulose ester film, a polyvinyl acetal film, a polystyrene film, a polycarbonate film, a polyethylene terephthalate film, and a film related thereto or a plastic material may be used. Further, a paper support laminated with a polymer such as polyethylene, etc., can be used. The polyesters described in U.S. Pat. Nos. 3,634,089 and 3,725,070 are preferably used.

In the photographic light-sensitive material and the dye fixing material of the present invention, the photographic emulsion layer and other binder layers may contain inorganic or organic hardeners. It is possible to use chromium salts (chromium alum, chromium acetate, etc.), aldehydes (formaldehyde, glyoxal, glutaraldehyde, etc.), N-methylol compounds (dimethylolurea, methylol dimethylhydantoin, etc.), dioxane derivatives (2,3-dihydroxydioxane, etc.), active vinyl compounds (1,3,5-triacryloyl-hexahydro-s-triazine, 1,3-vinylsulfonyl-2-propanol, etc.), active halogen compounds (2,4-dichloro-6-hydroxy-s-triazine, etc.), mucohalogenic acids (mucochloric acid, mucophenoxychloric acid, etc.), etc., which are used alone or as a combination thereof.

The transfer of dyes from the light-sensitive layer to the dye fixing layer can be carried out using a dye transfer assistant.

The dye transfer assistants suitably used in a process wherein it is supplied from the outside include water and an aqueous solution containing sodium hydroxide, potassium hydroxide or an inorganic alkali metal salt. Further, a solvent having a low boiling point such as methanol, N,N-dimethylformamide, acetone, diisobutyl ketone, etc., and a mixture of such a solvent having a low boiling point with water or an alkaline aqueous solution can be used. The dye transfer assistant may be used by wetting the image receiving layer with the transfer assistant.

When the dye transfer assistant is incorporated into the light-sensitive material or the dye fixing material, it is not necessary to supply the transfer assistant from the outside. In this case, the above described dye transfer assistant may be incorporated into the material in the form of water of crystallization of microcapsules or as a precursor which releases a solvent at a high temperature.

More preferred process is a process wherein a hydrophilic thermal solvent which is solid at an ambient temperature and melts at a high temperature is incorporated into the light-sensitive material or the dye fixing material. The hydrophilic thermal solvent can be incorporated either into any of the light-sensitive material and the dye fixing material or into both of them. Although the solvent can be incorporated into any of the emulsion layer, the interlayer, the protective layer and the dye fixing layer, it is preferred to incorporate it into the dye fixing layer and/or adjacent layers thereto.

Examples of the hydrophilic thermal solvents include ureas, pyridines, amides, sulfonamides, imides, alcohols, oximes and other heterocyclic compounds.

Other compounds which can be used in the photosensitive material of the present invention, for example, sulfamide derivatives, cationic compounds containing a pyridinium group, surface active agents having polyethylene oxide chains, antihalation and anti-irradiation dyes, hardeners, mordants and so on, are those described in U.S. Pat. Nos. 4,500,626, 4,478,927, 4,463,079, Japanese Patent Application No. 28928/83 (corresponding to U.S. patent application Ser. No. 582,655, filed on Feb. 23, 1984) and U.S. Pat. No. 4,503,137. Methods for the exposure and so on cited in the above described patents can be employed in the present invention also.

The heat developable light-sensitive material containing a compound represented by the above general formula (I) as a base precursor according to the present invention provides an image having a high density in a short time, has no change of photographic properties over a long lapse of time, and has a very good storage stability.

The invention will now be described by reference to specific examples which are not meant to be limiting.

Unless otherwise specified, all ratios, percentages, etc., are by weight.

EXAMPLE 1

Preparation of a Silver Iodobromide Emulsion 40 g of gelatin and 26 g of potassium bromide were dissolved in 3,000 ml of water. This solution was stirred at 50° C.

200 ml of water containing 34 g of silver nitrate and 200 cc of the solution prepared by dissolving 0.02 g of the below mentioned Dye I into 300 cc of methanol were added to the above mentioned gelatin solution over 10 minutes. Then, to this solution 100 ml of water containing 3.3 g of potassium iodide was added over 2 minutes.

The thus prepared silver iodobromide emulsion was adjusted in pH, precipitated and freed of excess salts.

The silver iodobromide emulsion was then adjusted to pH 6.0, whereby 400 g of a silver iodobromide emulsion was obtained.

Preparation of a Gelatin Dispersion of a Coupler 5 g of 2-dodecylcarbamoyl-1-naphthol, 0.5 g of succinic acid-2-ethylhexyl ester sulfonic acid sodium salt and 2.5 g of tricresyl phosphate (TCP) were dissolved to 30 ml of ethyl acetate. A mixture of this solution and 100 g of a 10% aqueous solution of gelatin was stirred and dispersed by means of a homogenizer at 10,000 rpm for 10 minutes.

Dye I

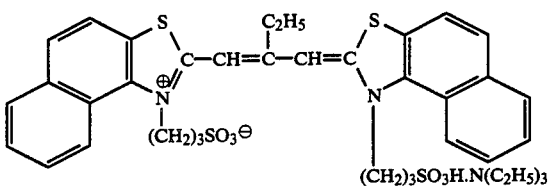

The coating solution comprised of the following components was coated onto a polyethylene terephthalate film support at a wet layer thickness of 60 μm and dried, whereby the light-sensitive material was prepared.

| | |
|---|---|
| (a) Silver iodobromide emulsion | 10 g |
| (b) Gelatin dispersion of the coupler | 3.5 g |
| (c) Base Precursor (7) of the present invention | 0.42 g |
| (d) Gelatin (10% aqueous solution) | 5 g |
| (e) 17 cc of an aqueous solution containing 0.2 g of 2,6-dichloro-p-aminophenol | |

This light-sensitive material was imagewise exposed by a tungsten lamp at 2,000 lux for 5 seconds. Then, the light-sensitive material was heated uniformly at 150° C. for 20 seconds on a heated block to obtain a negative cyan color image. The density of the image was measured by use of a Macbeth transmission densitometer (TD-504) to obtain the result of 0.20 of the minimum density and 2.03 of the maximum density. Thus, the compound of the present invention gives a high maximum density and a low minimum density.

EXAMPLE 2

The iodobromide emulsion used in Example 1 and the following dispersion of a dye providing substance were used.

Preparation of a Dispersion of a Dye Providing Substance 5 g of the blow mentioned Dye Providing Substance (CI-2), 0.5 g of succinic acid-2-ethylhexyl ester sulfonic acid sodium salt as a surface active agent and 5 g of tricresyl phosphate (TCP) were dissolved into 30 ml of ethyl acetate at about 60° C. A mixture of this solution and 100 g of a 10% aqueous solution of gelatin was stirred and dispersed by means of a homogenizer at 10,000 rpm for 10 minutes.

Dye Providing Substance (CI-2)

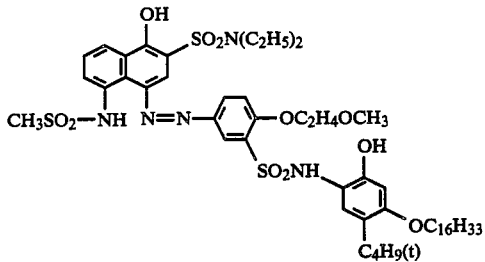

Preparation of a Light-Sensitive Coating Solution

| | |
|---|---|
| (a) Light-sensitive silver iodobromide emulsion (as shown in Example 1) | 25 g |
| (b) Dispersion of Dye Providing | 33 g |

| | | |
|---|---|---|
| | Substance (CI-2) described above | |
| (c) | 5% Aqueous solution of the following compound: | 10 ml |

$$C_9H_{19}\text{—}\phenyl\text{—}O(CH_2CH_2O)_{10}H$$

| | | |
|---|---|---|
| (d) | 10% Aqueous solution of the following compound: $H_2NSO_2N(CH_3)_2$ | 4 ml |
| (e) | Base Precursor (7) of the present invention | 4.1 g |
| (f) | Water | 20 ml |

A mixture of the above components (a) to (f) was dissolved under heating. Then, the solution was coated on a polyethylene terephthalate film support at a wet layer thickness of 30 μm. This coating material was dried and imagewise exposed by a tungsten lamp at 2,000 lux for 10 seconds. Then, the coating material was uniformly heated at 150° C. for 20 seconds on a heated block. This coating material is designated Sample A.

Sample B was prepared in the same way as Sample A except adding 1.8 g of guanidinetrichloroacetic acid in substitution of the compound of the present invention in component (e) of Sample A.

In the same method as above, Sample C was prepared using 2.1 g of guanidine salt of phenylsulfonylacetic acid and Sample D was prepared using 2.2 g of a guanidine salt of 3-sulfamoylphenylsulfonylacetic acid. Samples B, C and D were treated by the same process as above.

Preparation of an Image Receiving Material Containing an Image Receiving Layer 10 g of poly(acrylate methyl-co-N,N,N-trimethyl-N-vinylbenzylammoniumchloride) (molar ratio of methyl acrylate to vinylbenzylammoniumchloride is 1:1) was dissolved into 200 ml of water and this aqueous solution was uniformly mixed with 100 g of 10% aqueous solution of lime-treated gelatin. This mixture was uniformly coated at a wet thickness of 90 μm on a paper support laminated with polyethylene containing titanium dioxide dispersed therein. This material was dried to provide an image receiving layer.

The image receiving material was soaked in water and superimposed on each of the above heated light-sensitive materials A, B, C and D in such a manner that their layers contacted each other.

After heating at 80° C. for 6 minutes on a heating block, the image receiving material was separated from the light-sensitive material to obtain a negative magenta color image thereon.

The maximum density (Dmax) and the minimum density (Dmin) of the negative color image were measured by a Macbeth reflective densitometer (RD-519).

Moreover, Samples A, B, C and D were stored at 60° C. for 2 days and processed in the same manner as above. Then, a maximum density (D'max) and a minimum density (D'min) of these processed samples were measured in the same manner as above.

The results are shown in Table 1.

TABLE 1

| Sample No. | Dmax | Dmin | D'max | D'min |
|---|---|---|---|---|
| A | 2.04 | 0.22 | 2.10 | 0.29 |

TABLE 1-continued

| Sample No. | Dmax | Dmin | D'max | D'min |
|---|---|---|---|---|
| (Present Invention) | | | | |
| B (Comparison) | 2.14 | 0.58 | fog throughout the surface | fog throughout the surface |
| C (Comparison) | 1.28 | 0.16 | 1.33 | 0.20 |
| D (Comparison) | 1.45 | 0.15 | 1.49 | 0.27 |

It is seen from Table 1 that the base precursor of the present invention provides a high maximum density and a low minimum density and the samples containing the base precursor of the present invention have a good storage stability.

EXAMPLE 3

The procedure of Example 2 was repeated except that the base precursors described below were used. The results are shown in Table 2.

TABLE 2

| Sample No. | Base Precursor (amount added) | Dmax | Dmin | D'max | D'min |
|---|---|---|---|---|---|
| E | Compound (4) (3.4 g) | 2.06 | 0.20 | 2.02 | 0.26 |
| F | Compound (9) (4.1 g) | 2.08 | 0.24 | 2.05 | 0.30 |
| G | Compound (10) (4.1 g) | 2.01 | 0.21 | 2.06 | 0.29 |
| H | Compound (14) (4.1 g) | 2.03 | 0.24 | 1.98 | 0.28 |

It is seen from Table 2 that the base precursor of the present invention provides a high maximum density and a low minimum density and the samples containing the base precursor of the present invention have a good storage stability.

EXAMPLE 4

An example in which an organic silver salt oxidizing agent was used is described below.

Preparation of a Silver Benzotriazole Emulsion

Gelatin (28 g) and benzotriazole (13.2 g) were dissolved in water (3,000 ml). The resulting solution was stirred at 40° C. Into this solution a solution containing silver nitrate (17 g) dissolved in water (100 ml) was added over 2 minutes.

The resulting benzotriazole silver emulsion was adjusted in pH to precipitate and the excess salt was removed. The emulsion was adjusted to pH 6.0, whereby 400 g of a silver benzotriazole emulsion was obtained.

Using this silver benzotriazole emulsion, a light-sensitive coating composition was prepared as follows.

| | | |
|---|---|---|
| (a) Silver iodobromide emulsion (as described in Example 1) | 20 g | |
| (b) Silver benzotriazole emulsion | 10 g | |
| (c) Dispersion of the dye providing substance (as described in Example 2) | 33 g | |
| (d) 5% Aqueous solution of the following compound: $C_9H_{19}-\phenyl-O(CH_2CH_2O)_{10}H$ | 10 ml | |
| (e) 10% Aqueous solution of the following compound: $H_2NSO_2N(CH_3)_2$ | 4 ml | |
| (f) Base Precursor (7) of the present invention | 3.7 g | |
| (g) Gelatin dispersion of acid precursor described below | 8 ml | |
| (h) Water | 12 ml | |

Gelatin dispersion of acid precursor described in (g) was prepared as follows.

A compound described below (10 g) was added to a 1% aqueous solution of gelatin (100 g) and ground by use of glass beads (100 g) having a mean grain diameter of about 0.6 mm in a mill for 10 minutes. The glass beads were filtrated out to obtain a gelatin dispersion of the acid precursor.

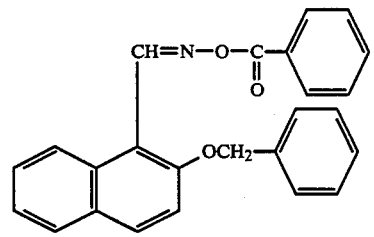

After mixing (a) to (h) described above, a sample was prepared and processed in the same way as in Example 2. The results are shown below.

| Sample | Dmax | Dmin |
|---|---|---|
| A' Containing Base Precursor (7) (Present Invention) | 2.08 | 0.20 |
| B' Containing Guanidine Trichloroacetic Acid (Control) | 2.33 | 0.61 |
| C' Containing Guanidine Salt of Phenylsulfonylacetic Acid (Control) | 1.47 | 0.19 |

It is understood that the base precursor of the present invention gives a high maximum density and a low minimum density.

Samples A', B' and C' were stored at 60° C. for 2 days and processed in the same manner as above. The minimum density and the maximum density of Sample A' were 0.31 and 2.10, respectively, and those of Sample C' were 0.20 and 1.52, respectively, but fog occurred throughout the surface of Sample B'. It is seen that Sample A' of the present invention has an improved storage stability.

EXAMPLE 5

Preparation of a Silver Benzotriazole Emulsion Containing Light-Sensitive Silver Bromide Benzotriazole (6.5 g) and gelatin (10 g) were dissolved in water (1,000 ml). The resulting solution was stirred at 50° C. A solution containing silver nitrate (8.5 g) dissolved in water (100 ml) was added to the above solution over 2 minutes.

To this solution a solution containing potassium bromide (1.2 g) dissolved in water (50 ml) was added over 2 minutes. The prepared emulsion was adjusted in pH to precipitate and the excess salt was removed. The emulsion was adjusted to pH 6.0, whereby 200 g of the emulsion was obtained.

Preparation of a Gelatin Dispersion of a Dye Providing Substance

Dye providing substance (CI-16) having the following formula (10 g),

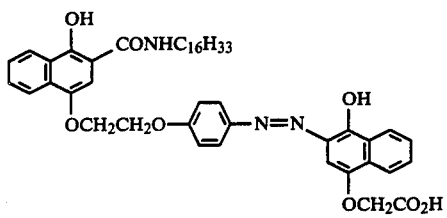

succinic acid-2-ethylhexyl ester sulfonic acid sodium salt (0.5 g) as a surface active agent, and tricresyl phosphate (TCP) (4 g) were uniformly dissolved in cyclohexanone (20 ml) at 60° C. A mixture of the resulting solution and 10% aqueous solution (100 g) of lime-processed gelatin was dispersed by means of a homogenizer at 10,000 rpm for 10 minutes.

Preparation of a Light-Sensitive Coating Material

| | | |
|---|---|---|
| (a) | Silver benzotriazole emulsion containing light-sensitive silver bromide | 10 g |
| (b) | Dispersion of dye providing substance (prepared in this Example) | 3.5 g |
| (c) | Base Precursor (7) of the present invention | 0.42 g |
| (d) | Gelatin (10% aqueous solution) | 5 g |
| (e) | Methanol solution containing 2,6-dichloro-4-aminophenol (200 mg) | 4 ml |

(a) to (e) described above were mixed and melted. The resulting solution was coated at a wet layer thickness of 30 μm on a polyethylene terephthalate film having a thickness of 180 μm. After drying, this coating sample was imagewise exposed at 2,000 lux for 10 seconds by a tungsten lamp. Then, this sample was uniformly heated at 150° C. for 20 minutes on a heated block.

Using the image receiving material prepared in Example 2 the heated sample was processed in the same manner as Example 2 to obtain a negative magenta color image on the image receiving material. The maximum density and the minimum density of this negative image were 2.10 and 0.24, respectively, measured by means of a Macbeth reflective densitometer (RD-519).

It is seen that the compound of the present invention shows a good effect.

EXAMPLE 6

Preparation of a Gelatin Dispersion of the Following Dye Providing Substance

Dye providing substance having the formula below (5 g),

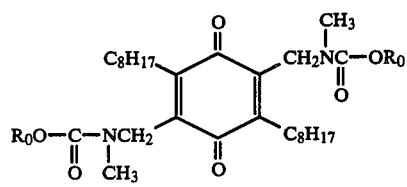

wherein $R_0$ represents a group having the following formula:

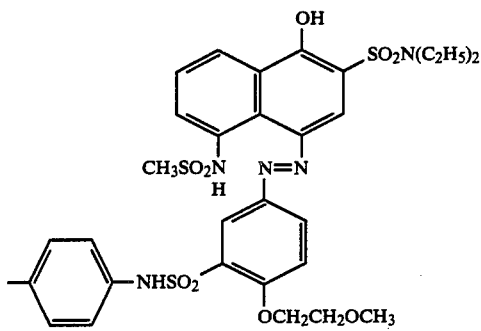

electron donative substance having the following formula (4 g),

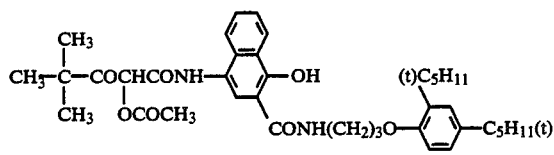

succinic acid-2-ethylhexyl ester sulfonic acid sodium salt (0.5 g) and tricresyl phosphate (TCP) (10 g) were dissolved into cyclohexanone (20 ml) at about 60° C. A mixture of the resulting solution and a 10% aqueous solution (100 g) of gelatin was dispersed by means of a homogenzer at 10,000 rpm for 10 minutes.

Preparation of a Light-Sensitive Coating Material

| | | |
|---|---|---|
| (a) | Silver benzotriazole emulsion containing light-sensitive silver bromide (described in Example 5) | 10 g |
| (b) | Dispersion of dye providing substance (prepared in this Example) | 3.5 g |
| (c) | Base Precursor (7) | 0.48 g |
| (d) | 5% Aqueous solution of the following compound: | 1.5 ml |

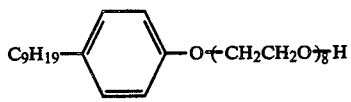

Water (4 ml) was added to the mixture of (a) to (d). After melting, this solution was coated at a wet layer thickness of 30 μm on a polyethylene terephthalate film. This coating material was dried to provide a light-sensitive material.

This light-sensitive material was imagewise exposed at 2,000 lux for 10 seconds by a tungsten lamp. Then, the light-sensitive material was uniformly heated at 140° C. for 40 seconds on a heating block. The image receiving material described in Example 2 was soaked in water and superimposed on the above heated light-sensitive material in such a manner that their layers were in contact with each other. A positive magenta color image was obtained on the image receiving material. The density of this positive image was measured by green light by use of a Macbeth reflective densitometer (RD-519) to obtain 2.09 as a maximum density and 0.23 as a minimum density.

It is seen that the base precursor of the present invention is effective.

While the invention has been described in detail and with reference to specific embodiments thereof, it will be apparent to one skilled in the art that various changes and modifications can be made therein without departing from the spirit and scope thereof.

What is claimed is:

1. A heat developable light-sensitive material comprising a support having thereon a light sensitive silver halide emulsion layer and at least one of a reducing agent or a reductive dye providing substance, wherein one layer contains a base precursor represented by the following general formula (I):

$$\left( \begin{array}{c} R_1 \\ | \\ R_2-C-CO_2H \\ | \\ X_0 \\ | \\ Y_0 \end{array} \right)_n \cdot B \qquad (I)$$

wherein $R_1$ and $R_2$, which may be the same or different, represent a hydrogen atom; a halogen atom; a substituted or unsubstituted alkyl group, cycloalkyl group, alkenyl group, alkynyl group, aralkyl group, aryl group, heterocyclic group, amino group, alkoxycarbonyl group, aryloxycarbonyl group, carbamoyl group, sulfamoyl group, alkoxy group, aryloxy group, acylamino group or acyloxy group; a sulfonyl group, a phosphonyl group, a phosphinyl group, a thio group and a sulfinyl group which are substituted by a substituted or unsubstituted alkyl group or aryl group; a cyano group; a carboxy group or a salt of a carboxy group; $R_1$ and $R_2$ may combine with each other to form a ring; $X_0$ represents an oxygen atom or an $$-N-R_3$$
$$|$$

group wherein one covalent bonds is to the carbon atom adjacent to $X_0$ in formula (I), the second covalent bond is to $Y_0$ and $R_3$ represents a hydrogen atom, a substituted or unsubstituted alkyl group or a substituted or unsubstituted aryl group; $Y_0$ represents a group accelerating a reaction of decarboxylation by heating; B represents an organic base; n is 1 when B is a monoacid base, n is 2 when B is a diacid base, and n is a reciprocal of a number of a carboxyl group when an $$R_1$$
$$|$$
$$R_2-C-CO_2H$$
$$|$$
$$X_0-Y_0$$

group is a polybasic free acid.

2. A heat developable light-sensitive material as in claim 1, wherein $R_1$ and $R_2$ are a phenyl group, a p-chlorophenyl group, a p-cyanophenyl group, an indenyl group or a fluorenyl group.

3. A heat developable light-sensitive material as in claim 1, wherein X represents an oxygen atom or an $$-N-R_3$$
$$|$$

group wherein one covalent bonds is to the carbon atom adjacent to $X_0$ in formula (I), the second covalent bond is to $Y_0$ and $R_3$ is a hydrogen atom, a $-CH_3$ group, a $-C_2H_5$ group, a

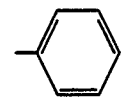

group, a $-CH_2CH_2OH$ group, a $-CH_2CH_2OCH_3$ group or a $-CH_2CH_2CN$ group.

4. A heat developable light-sensitive material as in claim 1, wherein $Y_0$ is a group such that a conjugate acid of $Y_0$ ($Y_0H$) has a pKa value of from 2 to 18.

5. A heat developable light-sensitive material as in claim 4, wherein $Y_0$ is a group which is released upon heating having an L value of Swain greater than $-1$.

6. A heat developable light-sensitive material as in claim 1, wherein $Y_0$ is a group such that a conjugate acid of B (BH) has a pKa value of above 7 and B has less than 12 carbon atoms.

7. A heat developable light-sensitive material as in claim 1, wherein B is a low volatiled base which has a boiling point above 150° C. and a conjugated acid of B (BH) has a pKa value above 10.

8. A heat developable light-sensitive material as in claim 1, wherein B is dimethylamine, diethylamine, piperidine, piperazine, ethylenediamine, N,N'-dimethylethylenediamine, acetamidine, diazabicyclononene, diazabicycloundecene, hydroxytetramethylammonium, hydroxytetraethylammonium,

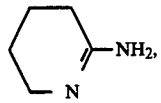 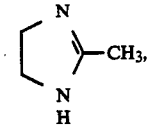

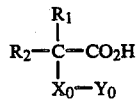 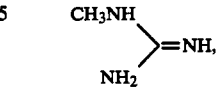

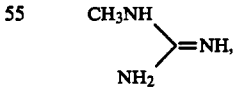 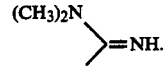

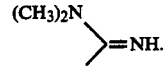

9. A heat developable light-sensitive material as in claim 1, wherein the heat developalbe light sensitive material contains the reducing agent.

10. A heat developable light-sensitive material as in claim 1, wherein the heat developable light sensitive material contains the reductive dye providing substance.

* * * * *